United States Patent [19]

Karwat et al.

[11] 4,155,988
[45] May 22, 1979

[54] REDUCTION OF SULFUR CONCENTRATION IN PHYSICAL SCRUBBING AGENTS

[75] Inventors: Heinz Karwat, Pullach; Wolfgang Jelend, Munich, both of Fed. Rep. of Germany

[73] Assignee: Linde Aktiengesellschaft, Wiesbaden, Fed. Rep. of Germany

[21] Appl. No.: 763,467

[22] Filed: Jan. 28, 1977

[51] Int. Cl.$^2$ .................. C01B 21/54; C01B 17/00; C01B 17/02

[52] U.S. Cl. ............................ 423/366; 55/68; 55/73; 423/243; 423/575

[58] Field of Search .................. 423/242–244, 423/366, 575; 55/68, 73

[56] References Cited

U.S. PATENT DOCUMENTS

| | | | |
|---|---|---|---|
| 3,318,666 | 5/1967 | Every et al. | 423/575 |
| 3,904,734 | 12/1975 | Gosden et al. | 423/366 |
| 3,937,795 | 2/1976 | Hasebe | 423/243 |
| 3,956,460 | 5/1976 | Brocoff | 423/366 |
| 3,965,243 | 6/1976 | Krochat | 423/366 |
| 4,017,594 | 4/1977 | Fenton et al. | 423/236 |

Primary Examiner—O. R. Vertiz
Assistant Examiner—Gregory A. Heller
Attorney, Agent, or Firm—Millen & White

[57] ABSTRACT

In a low temperature gas scrubbing process with a physical scrubbing solution, e.g., methanol, wherein either the H$_2$S containing gas-to-be-scrubbed, e.g., coal gasification gas, has a sufficient concentration of SO$_2$ and/or O$_2$ or wherein the H$_2$S containing scrubbing solution is brought into contact with a second O$_2$ and/or SO$_2$ containing gas, e.g. a stripping gas, to form elemental sulfur in the scrubbing solution, and said scrubbing solution is regenerated and then cooled to the scrubbing temperature, the improvement which comprises adding a sufficient amount of cyanides to the scrubbing solution to convert the elemental sulfur to thiocyanate, whereby sulfur is not precipitated in the scrubbing solution which would have otherwise occured, and removing the thiocyanate at least partially from the scrubbing solution. The cyanides may be added to the gas-to-be-scrubbed or the scrubbing solution, or there may be sufficient hydrocyanic acid in the gas-to-be-scrubbed at the outset.

20 Claims, 1 Drawing Figure

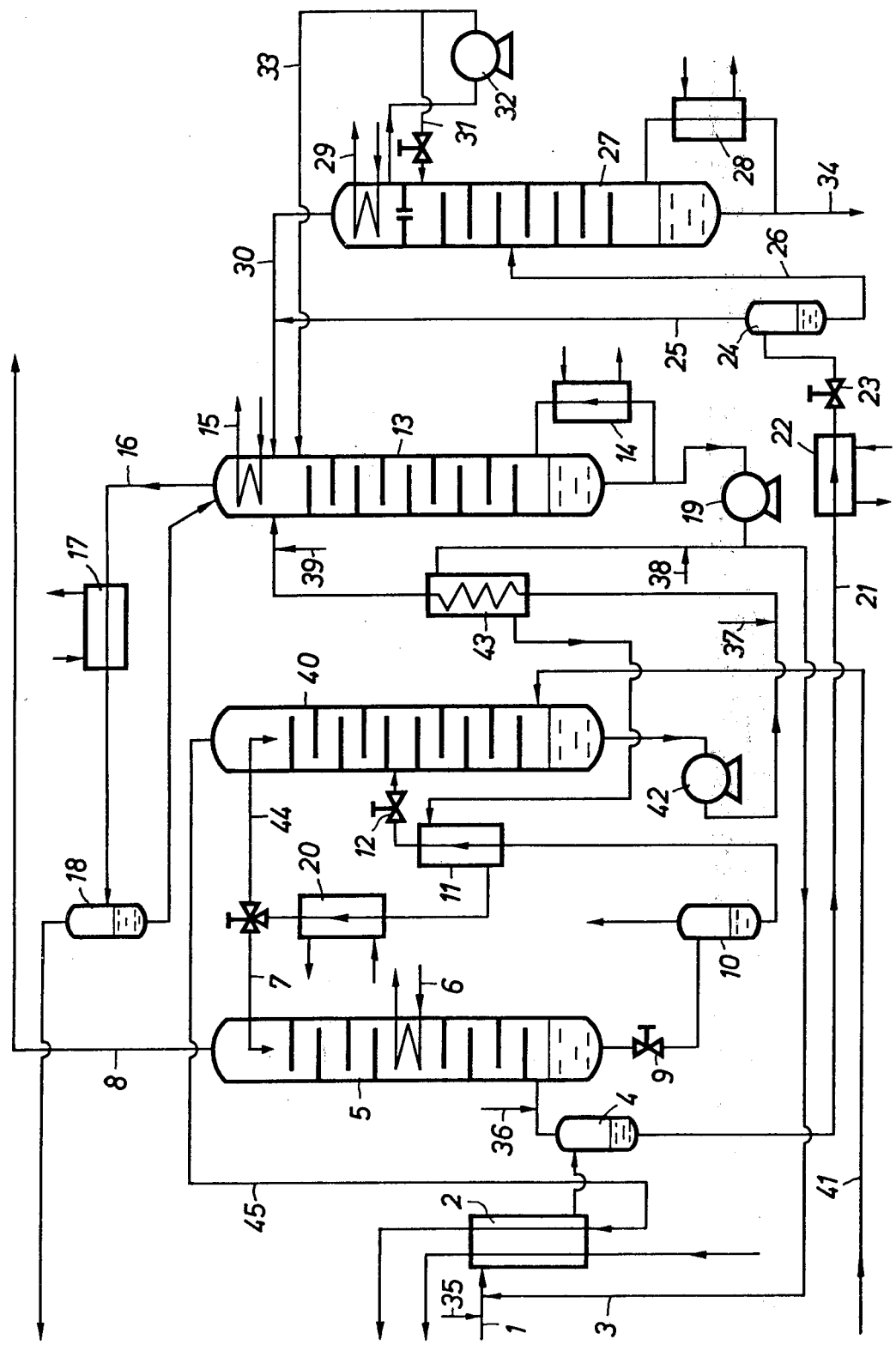

REDUCTION OF SULFUR CONCENTRATION IN PHYSICAL SCRUBBING AGENTS

BACKGROUND OF THE INVENTION

This invention relates to a system for reducing the concentration of elemental sulfur in physical scrubbing agents used for the removal from gases, e.g. coal gasification gas, of volatile sulfur compounds, such as hydrogen sulfide, sulfur dioxide, carbonyl sulfide and/or mercaptans.

In view of the relatively limited supply of gaseous and liquid fossil fuels, coal will be used to an increasing extent as the starting material for the production of hydrogen for the ammonia synthesis or for hydrogenation purposes, as well as for obtaining $CO$—$H_2$ mixtures for either methanol or Fischer-Tropsch syntheses. For this purpose, the coal is partially oxidized with steam and oxygen or air, yielding a gas which contains in addition to hydrogen and carbon monoxide, considerable amounts of carbon dioxide and, as impurities, hydrogen sulfide, carbonyl sulfide, mercaptans and oxygen and/or sulfur dioxide.

Before the gases can be used for the various syntheses, they must first be subjected to a series of conversion and purifying steps. For example, when producing hydrogenation-grade hydrogen or ammonia syntheses gas, the carbon monoxide present in the gas is converted, i.e., reacted with steam, thus producing hydrogen and carbon dioxide. The carbon dioxide is then separated from the gas and often purified to the extent it can then be used for further syntheses, for example for urea synthesis. Conversely, if it is desired to produce methanol synthesis gas or Fischer-Tropsch synthesis gas, i.e., mixtures of carbon monoxide and hydrogen, then only a partial conversion of any excess carbon monoxide is conducted, as required.

Irrespective of the synthesis involved, in all cases the sulfur compounds must be removed from the gas before the actual synthesis, since such sulfur compounds act, inter alia, as catalyst poisons. To remove sulfur compounds from gases, along with high concentrations of carbon dioxide, the so-called physical scrubbing methods have proven to be effective for many years. During such scrubbing processes, no chemical reaction takes place between the components to be removed and the scrubbing agent; rather, merely a solution occurs, the extent of which depends essentially on the solubilities of the respective components in the scrubbing agent, which in turn are dependent on the pressure and temperature employed. The regeneration of such scrubbing agents takes place by expansion and/or heating and/or by stripping with a gas having very low partial pressures of the components to be removed.

Highly suitable physical scrubbing agents for such components, e.g. $H_2S$ and $CO_2$, are polar organic scrubbing agents, and especially lower monohydric alcohols, such as methanol, and also ketones, such as acetone, and polyhydric alcohols, such as ethylene glycol.

Since the solubility of the components to be scrubbed generally increases with increasing pressure and with decreasing temperature, such scrubbing processes, e.g., methanol scrubbing steps, are conducted under pressures of up to 150 atmospheres absolute and at temperatures down to $-70°$ C., usually in the range of under 10 to 80 atmospheres and at $0°$ C. to $-60°$ C.

In a conventional process of this type (DAS (German Published Application) No. 1,567,690), a coal gasification gas is, after quenching and cooling, first freed of $H_2S$ and COS in a first scrubbing stage with methanol and then warmed; the CO in the gas is converted to $CO_2$; the resultant gaseous mixture is cooled and then freed of $CO_2$ in a second scrubbing stage, likewise with the aid of methanol. The remaining gas, containing residual impurities of carbon monoxide, methane and argon, is freed of these components in a scrubbing process with liquid nitrogen and fed to the ammonia synthesis in the form of a nitrogen-hydrogen mixture.

Difficulties are encountered in this process if the coal gasification gas, depending on the type of raw material, on the type of gasification method and on the pre-purification steps employed, contains $O_2$ and/or $SO_2$ in addition to hydrogen sulfide or if the $H_2S$ containing scrubbing solution is brought into contact with an $O_2$ and/or $SO_2$ containing gas, e.g. a stripping gas. As has been observed, elemental sulfur soon precipitates in the scrubbing agent even with the presence of concentrations in the order of a few p.p.m. of the $O_2$ and $SO_2$ in the gases concerned. Such elemental sulfur results in the clogging of the apparatus and pipelines, thus causing havoc in the process.

These difficulties might as well be encountered in $H_2S$ removal processes applied to other gases than coal gasification gas, e.g. all gases produced by partial oxidation of hydrocarbons, natural gas, hydrodesulfuration off-gases and reformer purge gas, if oxygen and/or sulfur dioxide is contained or formed in or likewise brought into these gases or if oxygen and/or sulfur dioxide is brought into the scrubbing agent.

The formation of elemental sulfur can probably be explained by the fact that a type of Claus process takes place among $H_2S$ and $SO_2$, and/or that $H_2S$ is oxidized by $O_2$ in the scrubbing agent, especially if it is warmed for regeneration purposes, leading to the formation of element sulfur.

SUMMARY OF THE INVENTION

A principal object of this invention is to provide a system to obviate the problem caused by the precipitation of the elemental sulfur.

Upon further steps of the specification and appended claims, further objects and advantages of this invention will become apparent to those skilled in the art.

These objects are attained by adding a sufficient amount of cyanides to the scrubbing solution to convert the elemental sulfur to thiocyanate. This is accomplished by the presence of hydrocyanic acid in the gas-to-be-processed or by the external addition of cyanides to the scrubbing solution. In any case, the resultant thiocyanate is then at least partially removed from the scrubbing agent to prevent an excessive build-up therein.

Parenthetically, it is to be noted that in DOS (German Unexamined Laid-Open Application) No. 2,260,247, there is disclosed a process for the removal of hydrogen cyanide from a loaded physical scrubbing agent wherein the scrubbing agent is combined with an alkaline aqueous polysulfide solution, and the thus-formed thiocyanate is separated from the scrubbing agent. This known process, however, is not suggestive of this invention because this invention is directed to the removal of elemental sulfur, not cyanide. Furthermore, in DOS No. 2,260,247, sulfur is used in the active form as a polysulfide in an alkaline aqueous solution, whereas in the present process the sulfur in the elemental form is present in an acidic medium. Consequently, it could nowise be expected that the reaction between the elemental sulfur dissolved in the anhydrous physical scrubbing agent and the cyanide would proceed at an adequate rate to overcome the problem of sulfur precipiation.

It is necessary to continuously measure the sulfur content of the circulating scrubbing agent and/or optionally the amount of $O_2$ and $SO_2$, which is absorbed from the gas by the scrubbing agent, and then to control the concentration of hydrocyanic acid existing in the gas proper and/or the amount of cyanides added so that the total amount of cyanides brought into the scrubbing agent is sufficient for converting the sulfur formed by the reaction:

$$2\ H_2S + O_2 = 2\ H_2O + 2\ S$$

and/or $$SO_2 + 2\ H_2S = 2\ H_2O + 3\ S$$

to thiocyanate by the reaction:

$$CN^- + S = SCN^-$$

or $$HCN + S = HCNS.$$

There should be brought into the scrubbing agent only as much cyanide as is necessary to reduce the sulfur content in the scrubbing agent down to a concentration that equals 50% to 90% of the lowest solubility of sulfur in the scrubbing agent, which is for example 8 mg S/kg methanol at $-60°$ C. An excess of cyanide in the scrubbing agent which might be corrosive is thereby avoided.

If the raw gas contains a relatively large amount of hydrocyanic acid, then a portion of the hydrocyanic acid must be removed from the gas to prevent an accumulation of hydrocyanic acid in the scrubbing cycle. However, the removal, which can be accomplished by a small pressurized water washing stage, must not be continued to completion. Rather, the amounts of cyanides necessary for an adequate formation of thiocyanate must always remain in the gas. On the other hand, if the raw gas contains too small an amount of cyanides, then it is sufficient to inject into the gas an appropriate amount of hydrocyanic acid and/or a solution of alkali or ammonium cyanide at a suitable point, in order to obtain the required cyanide concentration.

Instead of incorporating the necessary cyanides indirectly via the raw gas, another embodiment of the invention also offers the possibility of adding the cyanides to the scrubbing agent at a suitable location in the scrubbing-regenerating cycle, preferably before the loaded scrubbing agent is warmed for purposes of regeneration, and in any case, before the regenerated scrubbing agent, wherein dissolved sulfur has been formed, is cooled to the low scrubbing temperature.

The type of cation present in the added cyanides is of secondary importance. Although alkali cyanides can be handled somewhat more easily than free hydrocyanic acid, the latter offers the advantage in case of gases containing small quantities of ammonia that it forms ammonium cyanide with the ammonia, yielding, after the reaction with the sulfur, the stable ammonium thiocyanate which is readily soluble in a physical scrubbing agent, such as methanol, and which can remain in the scrubbing agent up to relatively high concentrations of about 0.3% by weight, without any problems.

So a certain amount of the thiocyanate formed during the reaction can remain permanently in the scrubbing agent and is circulated with the latter via the scrubbing step and the regeneration. To prevent the thiocyanate concentration from building up excessively, it is necessary to bleed off a sufficient quantity of a secondary stream from the scrubbing agent at a suitable place, to remove the thiocyanate therefrom and to recycle the thiocyanate-free scrubbing agent to the main stream. The bleed stream necessary to keep the thiocyanate concentration at the permitted maximum mentioned above, is determined by the amount of thiocyanate formed per unit time which likewise is calculated from the amount of sulfur converted per unit time divided by the permitted maximum concentration of thiocyanate (as given above = 0.3 wt.%).

It is, of course, also possible to regenerate the entire scrubbing agent so as to remove the entire amount of thiocyanate therein; however, such a process is relatively expensive and unnecessary under practical conditions in most cases, since the minor amount of circulating thiocyanate does not interfere with the solubilities of the remaining components to be scrubbed out.

If the raw gases contain water vapor, methanol is sprinkled on the heat exchanger during the cooling of the gases to the relatively low scrubbing temperature to prevent the deposition of ice within the heat exchanger which would otherwise cause the fouling of the same.

According to a special embodiment of this invention, the sprinkling step to which the heat exchanger is subjected is conducted with thiocyanate-containing scrubbing agent so that the thiocyanate is separated with the water, without any additional expenditure in apparatus, during the subsequent separation of the water from the methanol in a separation column. In this way, a further advantage for the process of this invention is attained, namely that no additional expense in apparatus or energy is associated with the removal of the thiocyanate.

The invention is especially applicable to the scrubbing of all gasification gases from coal or hydrocarbons, e.g. all gases produced by a partial oxidation of hydrocarbons, natural gas and reformer purge gas containing 0.01 to 30 percent by volume $H_2S$, either if the gases contain at least 1 p.p.m. up to about 1000 p.p.m. $O_2$ and/or if the $H_2S$ containing scrubbing agent is brought into contact with a second $O_2$ and/or $SO_2$ containing gas with $O_2$ contents usually from 5 p.p.m. to 210,000 p.p.m. and/or $SO_2$ contents from 1 p.p.m. to 10 p.p.m.

The process of this invention can be applied to all conventional physical scrubbing agents, such as, for example, mono- and polyhydric alcohols and ketones.

BRIEF DESCRIPTION OF THE DRAWING

The attached drawing is a schematic flowsheet of a preferred embodiment of the invention, and illustrates the variety of locations where cyanides can be added.

DETAILED DESCRIPTION OF THE DRAWING

Via conduit 1, 10.000 $Nm^3/h$. of coal gasification gas are introduced into the plant under a pressure of 30 bars and have a temperature of 30° C. The gas has a water content of about 1.2 grams/$Nm^3$ and has the following composition, on a dry basis:

| 50 | vol.% | $H_2$ |
|---|---|---|

-continued

| 38 | vol.% | CO |
|---|---|---|
| 11.89 | vol.% | $CO_2$ |
| 0.10 | vol.% | $H_2S$ |
| 0.01 | vol.% | COS |
| 3 | p.p.m. | $SO_2$ |
| 100 | p.p.m. | $O_2$ |

The gas is cooled to the scrubbing temperature in heat exchanger 2 against a $CO_2$—$H_2S$ mixture and against a fraction from a nitrogen scrubbing column, not shown. To avoid the formation of ice ($H_2O$) in heat exchanger 2 during this step, 0.2 metric tons/hour of methanol are injected into the gas via conduit 3. Condensates and methanol are separated in the separator 4, whereas the remaining gas enters the scrubbing column 5 which is under a pressure of 30 bars. The scrubbing column is provided with an ammonia cooler 6. Via conduit 7, 36 tons/hour of methanol are introduced into the head of the scrubbing column at a temperature of −40° C. In the scrubbing column, the gas is freed of $CO_2$, $H_2S$, COS, and $SO_2$, and during this step, minor proportions of $H_2$, CO and $O_2$, respectively, are likewise dissolved. Via conduit 8, 8.650 $Nm^3/h$. of a pure $H_2$—CO mixture are withdrawn from the head of the column; this mixture is fed to a low-temperature fractionation stage, not shown, for further processing to synthesis gas, for example to obtain CO and $H_2$.

The loaded scrubbing agent is warmed to a temperature of −15° C. by the absorption heat of solution at the sump of the scrubbing column, is expanded in a throttle valve 9 to 10 bars and introduced into a separator 10. Due to the expansion, $H_2$, CO, and $O_2$ are degasified, in addition to some $CO_2$ and $H_2S$, which are recycled to the raw gas in an amount of 140 $Nm^3/h$. The resultant partially expanded loaded scrubbing agent is warmed in a heat exchanger 11, further expanded in a throttle 12 to a pressure of 1.5 bar, and is introduced into the middle part of a stripping column 40. In this column, most of the $CO_2$ solved in the scrubbing agent is stripped off by a stream of 1800 $Nm^3/h$. nitrogen containing 0.05 Vol.% $O_2$ and being fed to the column via conduit 41. Due to the solubility of $O_2$ in methanol 0.015 $Nm^3/h$. $O_2$ are solved in the scrubbing agent leaving the column at the bottom and being introduced into the head of a regenerating column 13 via pump 42 and exchanger 43.

The regenerating column 13 is equipped with a head cooler 15, and a sump heater 14 operated with steam to maintain the sump temperature at 77° C. 90 $Nm^3/h$. of $N_2$, $CO_2$ and $N_2$ leave the head of the regenerating column via conduit 16 together with solvent vapors. To condense the solvent vapors, a cooler 17 is provided. The thus-condensed vapors are separated in separator 18 and recycled to the head of the regenerating column. The remaining gas can then be passed to further uses, e.g., sulfuric acid production.

The completely regenerated scrubbing agent is further conveyed by means of a pump 19. The predominant portion is cooled to −40° C. in heat exchangers 43 and 11 and in an ammonia cooler 20. 36 metric tons/h. thereof are fed via conduit 7 to the head of the scrubbing column, whereas 15 metric tons/h. are fed to the top of the stripping column 40 to remove traces of $H_2S$ from the $CO_2$ and $N_2$, the latter leaving the column via conduit 45 is warmed up in exchanger 2 by incoming raw gas. A small portion, namely 0.2 metric ton/hour, passes as described above into the raw gas via conduit 3.

The condensate obtained in separator 4 in an amount of 0.113 tons/hour of a methanol-water mixture inclusive of dissolved gases is fed via conduit 21 to a heat exchanger 22 heated by a process stream to be cooled, then expanded in a throttle 23 to a pressure lying somewhat above 1.8 bar, and introduced into a separator 24. The thus-liberated gas, namely $CO_2$ and $H_2S$ in addition to a small amount of $H_2$ and CO, is again conducted via conduit 25 to the head of the regenerating column 13. The remaining liquid is introduced via conduit 26 to approximately the middle of a methanol-water separating column 27 which is under a pressure of 1.8 bar. The column 27 is equipped with a sump heater 28 which maintains the sump at 115° C., and with a head cooler 29. The head gases pass via conduit 30, together with the gases from conduit 25, into the head of the regenerating column 13, while the methanol which is discharged overhead is condensed on the cooling coil 29 and recycled in part via conduit 31 into the methanol-water separating column, but in part is pumped by means of the pump 32 via conduit 33 to the head of the regenerating column 13. The remaining water is drained by way of conduit 34.

The 3 p.p.m. $SO_2$, corresponding to 0.03 $Nm^3$ of $SO_2/h$, contained in the coal gasification gas, which react with 0.06 $Nm^3/h$ $H_2S$ during the course of the process with the formation of sulfur, requires an amount of 0.09 $Nm^3/h$ of hydrocyanic acid to convert the produced sulfur to thiocyanate. As experience has shown of the 100 p.p.m. oxygen in the raw gas about 1 p.p.m. $O_2$ corresponding to 0.01 $Nm^3/h$ $O_2$ reacts with 0.02 $Nm^3/h$ $H_2S$ during the process forming sulfur and requires an amount of 0.02 $Nm^3/h$ hydrocyanic acid. The 0.015 $Nm^3/h$ $O_2$ which are introduced into the regenerating column 13 together with the scrubbing agent also react with $H_2S$ forming sulfur and require an amount of 0.030 $Nm^3/h$ HCN. The total amount of hydrocyanic acid required thus is 0.15 $Nm^3/h$. According to the invention, this amount is either already contained in the raw gas in conduit 1 corresponding to a concentration of 17 p.p.m. HCN or added to the scrubbing process at a suitable location in a suitable form. In case of raw gases containing an excess of cyanides (in the form of free hydrocyanic acid), this excess is removed from the raw gas by means of a conventional pressurized water washing step (not shown). If the raw gas does not contain sufficient cyanide, it is added to the raw gas at the locations denoted by 35 and 36 in the form of free hydrocyanic acid or in the form of a solution of alkali or ammonium cyanide. However, according to the invention, it is likewise possible to add the cyanides also at suitable locations to the scrubbing-regenerating process, for example at the points denoted by 37, 38 and 39.

It is merely necessary to add the cyanides, unless they are already present in the gas, either at those places where the scrubbing agent is about to be warmed so that the sulfur formed due to the Claus reaction and the direct oxidation of $H_2S$, which take place during the warming step, is immediately reacted, or at the latest at those points where the regenerated scrubbing agent, which contains sulfur dissolved therein is cooled down to the scrubbing temperature. Otherwise, when the solubility limit of the sulfur is passed in the downward direction, the aforementioned depositions of elemental sulfur would occur and clog the apparatus.

The thiocyanate formed by the reaction with cyanide which can be either alkali thiocyanate or, if the raw gas carries minor amounts of ammonia, also ammonium thiocyanate, passes, in the process, into the sump of the methanol-water separating column 27 and is removed via conduit 34 together with the water.

The preceding example can be repeated with similar success by substituting the generically or specifically described reactants and/or operating conditions of this invention for those used in the preceding example.

From the foregoing description, one skilled in the art can easily ascertain the essential characteristics of this invention and without departing from the spirit and scope thereof, can make various changes and modifications of the invention to adapt it to various usages and conditions.

What is claimed is:

1. In a gas scrubbing process of a gas-to-be-scrubbed containing carbon oxides and $H_2S$ with a circulating physical scrubbing solution consisting essentially of polar organic solvent wherein the scrubbing solution is acidic and contains dissolved $H_2S$ which forms dissolved elemental sulfur in the scrubbing solution by reacting with at least one member selected from the group containing $O_2$ and $SO_2$, said member being introduced either by the gas-to-be-scrubbed or by a second gas used in the process, and said scrubbing solution is regenerated;

the improvement which comprises adding a sufficient amount of cyanide to the scrubbing solution to convert said dissolved elemental sulfur to thiocyanate and to prevent precipitation of sulfur in the scrubbing solution, and removing the thiocyanate at least partially from the scrubbing solution.

2. A process according to claim 1, wherein cyanides are added to the scrubbing solution in an amount sufficient to convert those amounts of elemental sulfur to thiocyanate so that the sulfur in the scrubbing agent equals 50–90% of the lowest saturation solubility in the circulating scrubbing agent.

3. A process according to claim 1, wherein the sufficient cyanide addition to the scrubbing solution is achieved by passing cyanides into the gas-to-be-scrubbed.

4. A process according to claim 1, wherein the sufficient cyanide addition is achieved by adding the cyanide to the scrubbing solution at a location in the regeneration cycle where sulfur does not precipitate.

5. A process according to claim 4, wherein the cyanide is added to loaded scrubbing agent.

6. A process according to claim 4, wherein the cyanide is added to regenerated scrubbing agent.

7. A process according to claim 1, wherein the thiocyanate is removed with water during separation of water from a mixture of water and physical scrubbing solution derived from the sprinkling of a heat exchanger with said physical scrubbing solution to prevent water in the gas-to-be-scrubbed from forming ice in the heat exchanger.

8. A process according to claim 1, wherein the gas-to-be-separated has an excess of hydrogen cyanide and the hydrogen cyanide is removed by a pressurized water washing step with sufficient HCN being permitted to remain in the gas-to-be-scrubbed to achieve said sufficient addition of cyanides in the physical scrubbing solution.

9. A process according to claim 1, wherein said gas-to-be-separated is coal gasification gas.

10. A process according to claim 1, wherein said gas-to-be-separated is gasification gas from hydrocarbons.

11. A process according to claim 1, wherein said gas-to-be-separated is natural gas.

12. A process according to claim 1, wherein said gas-to-be-separated is hydrodesulfuration off-gas.

13. A process according to claim 1, wherein said gas-to-be-separated is reformer purge gas.

14. A process according to claim 1, wherein said physical scrubbing solution is methanol.

15. A process according to claim 1, further comprising the step of continuously measuring the sulfur content of the circulating scrubbing agent, and adding said sufficient amount of cyanide in response to said measurement.

16. A process according to claim 2, further comprising the step of continuously measuring the sulfur content of the circulating scrubbing agent, and adding said sufficient amount of cyanide in response to said measurement.

17. A process according to claim 1, wherein only a partial amount of the thiocyanate is removed from the scrubbing solution.

18. A process according to claim 17, wherein the physical scrubbing agent is methanol and up to 0.3% by weight of ammonium thiocyanate is permitted to remain therein.

19. A process according to claim 1, wherein the gas-to-be-scrubbed contains 0.01 to 30% by volume $H_2S$ and 1–1,000 ppm $O_2$.

20. A process according to claim 1, wherein the gas-to-be-scrubbed contains 0.01 to 30% by volume $H_2S$ and said second gas used in the process contains at least one of 5–210,000 ppm of $O_2$ and 1–10 ppm of $SO_2$.

* * * * *